May 10, 1932.   T. ZABROCKI   1,857,706
CAMERA BACK
Filed Aug. 17, 1931   4 Sheets-Sheet 1
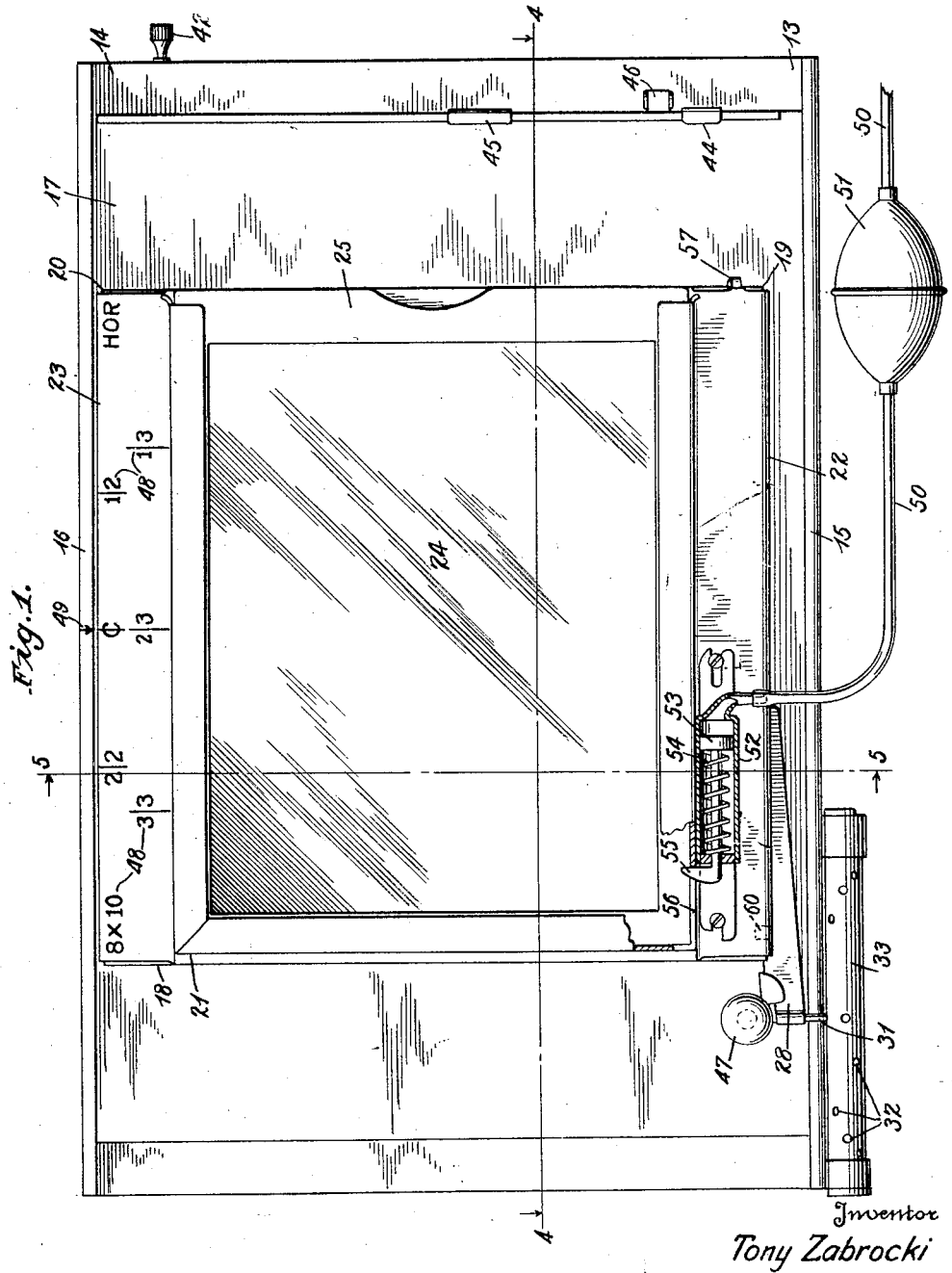
Inventor
Tony Zabrocki
By Brown & Phelps
Attorneys May 10, 1932. T. ZABROCKI 1,857,706
CAMERA BACK
Filed Aug. 17, 1931 4 Sheets-Sheet 2
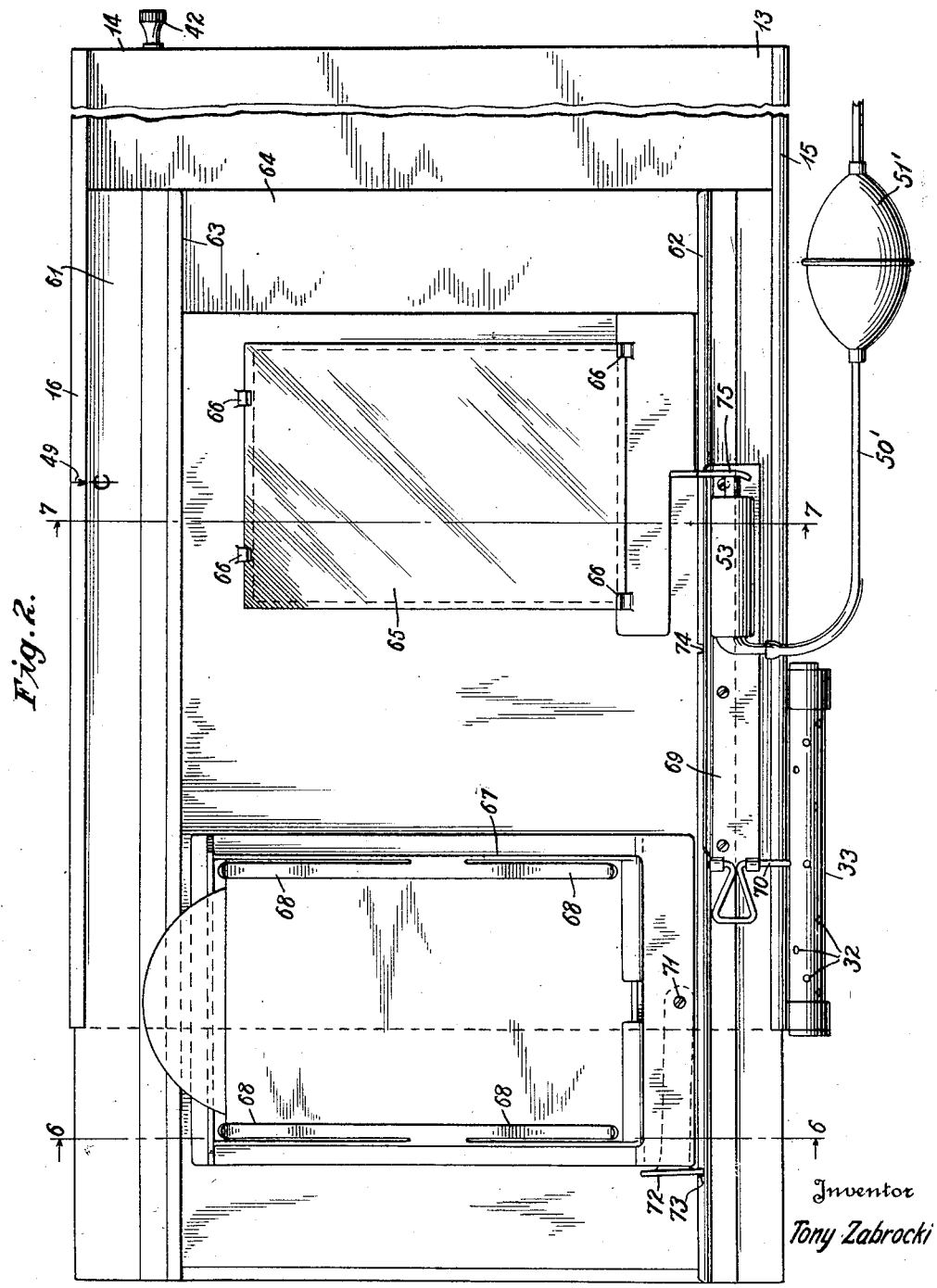
Inventor
Tony Zabrocki
By Brown & Phelps
Attorneys

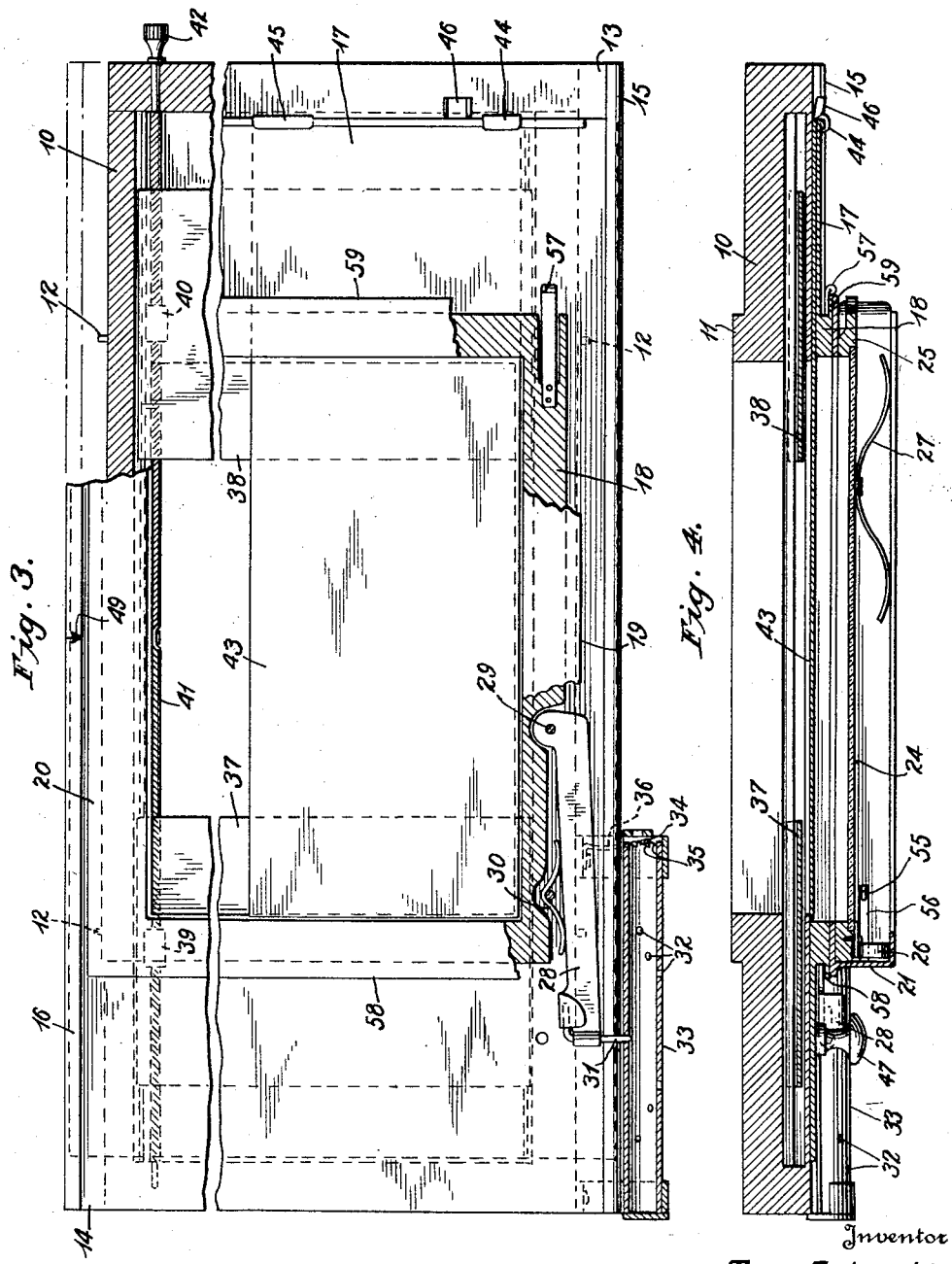

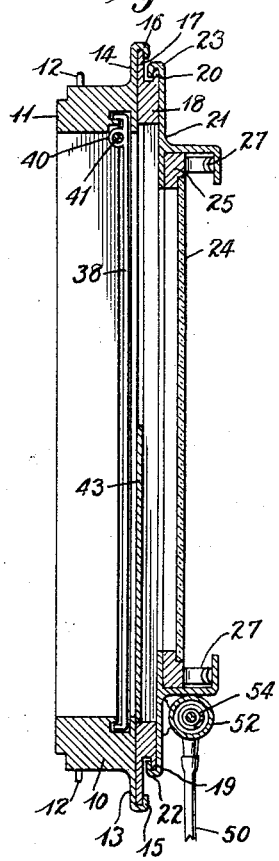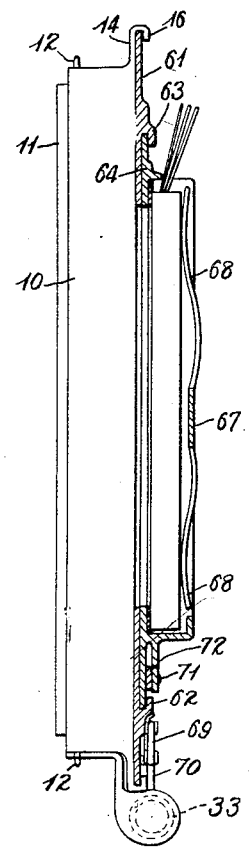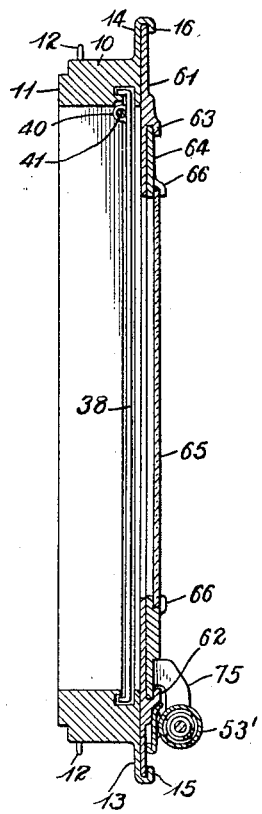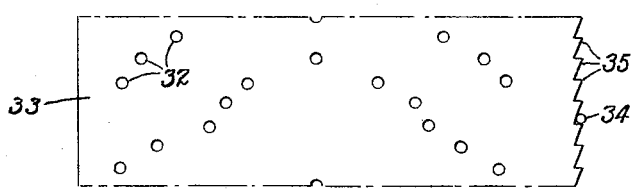

Patented May 10, 1932

1,857,706

UNITED STATES PATENT OFFICE

TONY ZABROCKI, OF WINONA, MINNESOTA

CAMERA BACK

Application filed August 17, 1931. Serial No. 557,712.

The invention relates to camera backs and has as an object the provision of a back for cameras having means to automatically close the shutter of a camera when a plate or film holder is moved to position to receive an exposure.

It is a further object of the invention to provide a camera back adapted to receive either plate holders or a sensitive material magazine, as a roll film holder, film pack or the like, each equipped with means to automatically close the shutter when moved to position for exposure.

It is a further object of the invention to provide a camera back having masking means and means to properly locate the sensitive material to receive an exposure in accordance with a portion of the film exposed by said masking means.

Further objects of the invention will appear from the following description when read in connection with the accompanying drawings showing illustrative embodiments of the invention, and wherein:—

Fig. 1 is a rear view partly broken away showing a plate holder receiving back with a ground glass focusing screen in place;

Fig. 2 is a rear view showing the plate holder frame of Fig. 1 replaced by a plate carrying a focusing screen and a film pack holder;

Fig. 3 is a view corresponding to Fig. 1 with the plate holder receiving frame omitted and with parts broken away to show portions of the masking and latching mechanism and with a part broken away to reduce its vertical extent;

Fig. 4 is a transverse section on line 4—4 of Fig. 1;

Fig. 5 is a transverse section on line 5—5 of Fig. 1;

Figs. 6 and 7 are transverse sections on lines 6—6 and 7—7 respectively of Fig. 2; and Fig. 8 is a development of the location device.

As shown in Figs. 1, 3, 4, and 5, there is provided a frame 10 having a raised portion 11 equipped with pins 12 to fit upon the back of a view camera in the ordinary manner.

The frame 10 is shown as provided with flanges 13, 14 having their edges turned as at 15, 16 to provide a groove for the reception of the ground glass and sensitive material receiving frame.

The portions thus far described are the same in the modification of Figs. 2, 6 and 7.

In the modification of Figs. 1, 3, 4, and 5, a base plate 17 is shown having its edges received in the grooves provided by the turned edges 15, 16, the base plate 17 being shown as provided with a portion 18 having projecting flanges 19, 20.

A ground glass receiving frame 21 provided with turned edges 22, 23 is shown in place upon the plate 17 and a ground glass focusing screen 24 mounted in frame 25 and provided with springs 26, 27 to press the screen into the focal plane is shown in situ in the frame 21. To locate the plate 17 upon the plate 14, there is shown a latch 28 pivoted upon the plate 17 at 29 pressed by spring 30 to a depressed position to cause the pin 31 to engage openings 32 in a locating device 33. A development of the surface of the locating device 33 is shown in Fig. 8 as provided with a series of openings for reception of the pin 31 and the openings are so placed as to properly locate the center of the various portions of 8 x 10 or 5 x 7 plates to receive exposures when the remainder of the field is masked out by the masking feature of the invention.

The locating device 33 is shown as tubular and revoluble in one direction only under control of a pin 34 coacting with ratchet teeth 35 in the end of the tube, the pin 34 being carried by a spring 36 as shown in Fig. 3.

To mask portions of the field, there is shown a pair of vertical masking plates 37, 38 having nuts 39, 40 traveling upon a threaded member 41 having oppositely directed threads upon its halves which may be revolved by means of a knurled head 42 to cause travel of the masking plates. To mask the opening in the direction at right angles to the plates 37, 38, there is shown a masking plate 43 slidable under the plate 17 and having turned over lips 44, 45 engaging the edge of the plate as shown at the right of Fig. 3, a finger piece 46 projecting from the masking plate 43 for manipulation thereof.

A knob 47 is shown rigidly secured to the plate 17 whereby the plate may be manually moved to its proper location and indices 48 are provided upon the plate holder carrying frame 21 which may be brought into registry with a mark 49 upon the edge of the plate 14 for proper location of the frame 21 to secure the desired results.

The back of the invention is designed to be used with a camera equipped with an ordinary shutter which may be retained in open position for focusing and which will be closed by suction applied to the tube 50 also including an operating bulb 51 shown in Fig. 1.

To cause suction in the tube 50, there is shown a cylinder 52 mounted upon the frame 21 having a piston 53 spring pressed to the right in Fig. 1 by means of spring 54, the piston rod being equipped with a hook 55 projecting into a slot 56 in the frame 21 into the path of a plate holder when inserted in the frame.

Assuming that the ground glass has been used to focus the device and to observe the correct masking of the field by the means described, the ground glass may then be removed and a plate holder forced into the frame. The end of the plate holder will then engage the hook 55 and force the piston 53 to the left in Fig. 1 causing suction to close the shutter, the plate holder having been forced home and by engagement with the hook 55 the shutter having been automatically closed, it is possible to immediately squeeze the bulb 51 and make the exposure before the subject to be photographed has had an opportunity to alter the desired pose.

In the form of Figs. 1 and 3 to 5 inclusive, the frame 21 may by pressure upon the latch 57 engaging over the edge of the frame as shown in Fig. 4, be released, when the frame may be slipped off from the flanges 19, 20, whereupon it may be reversed to an upright position and again slipped upon the end flanges 58, 59, a groove 60 being provided in the lower surface of the frame 21 for engagement with the shank of the latch 57.

The plate holder carrying plate 17 may be removed from the base plate 14 and the plate 61 of Figs. 2, 6, and 7 may be slipped into the same grooves under edges 15, 16. The plate 61 is shown as provided with grooves 62, 63 for reception of a plate 64 slidable upon the plate 61, the plate 64 being shown as provided at the right in Fig. 2 with a ground glass 65 retained thereon by ears 66 and located over an opening in the plate.

At the left of Fig. 2, the plate 64 is shown as equipped with a frame 67 for reception of a film pack or a film pack adapter, as desired, provided with springs 68 to press the film pack or adapter into the focal plane.

The plate 61 is shown as carrying a latch 69 provided with a pin 70 for engagement with the openings 32 of the locating device mounted upon frame 14.

The plate 64 has pivotally mounted at 71 thereon a latch 72 engageable with notches 73, 74 to locate the plate in focusing and exposing positions. A focusing cylinder similar to 53 is shown at 53' carried by the plate 61, the piston therein being moved by a spring to cause the suction, which spring is held in compressed position by means of a member 75 projecting from the plate 64 and holding the spring compressed when the latch member 72 is in contact with the notch 73 to hold the plate 64 in focusing position. When the focus has been adjusted and the latch 72 is released from notch 73, the plate 64 may be slipped to the right releasing the piston in cylinder 53' whereupon suction is produced in the tube 50' to close the shutter and when the plate 64 has been moved to the right and latch 72 placed in engagement with notch 74, the sensitive material will be in the field of exposure and the bulb 51' may be immediately pressed to make the exposure.

Minor changes may be made in the physical embodiments of the invention within the scope of the appended claims without departing from the spirit thereof.

I claim:

1. A camera back comprising, in combination, a frame having an opening and inwardly opening marginal grooves at opposite edges of its rear surface, a plate slidable in said grooves and having an exposure opening, indicia carried by said frame and plate respectively to be brought into registry to locate fractions of said exposure opening centrally of said frame opening, masking means carried by said frame to cover unused fractions of the frame opening, latch means to retain said plate in its various fractional exposure positions, and means on said plate to interchangeably hold a dark slide or a focusing screen over said exposure opening and means carried by said plate to cause closure of a shutter after focusing, actuated by movement of a dark slide to position over said exposure opening.

2. A camera back comprising, in combination, a frame having an opening and inwardly opening marginal grooves at opposite edges of its rear surface, a plate slidable in said grooves having inwardly opening spaced grooves parallel with its groove engaging edges and an opening registrable with said frame opening, a second plate slidable in said second named grooves having a plurality of openings selectively registrable with said first named openings, a focusing screen covering one of the last named openings, dark slide holding means surrounding another of said last named openings, and means carried by said first named plate actuated by movement of said second named plate to position with the dark slide opening into registry with the first named openings to actuate a shutter.

3. A camera back comprising, in combination, a supporting member for application to a camera having an opening, a plate having an opening and slidably carried by said member, a frame slidably carried by said plate to interchangeably hold a focusing screen and a dark slide with at least a portion thereof over said opening, a revoluble locating member carried by said support, means to hold said locating member in definite adjusted positions of revolution, said locating member having sets of openings positioned by said set adjustments, a latch carried by said frame for engagement with a desired opening of a set thereof in said locating member in its adjusted position, whereby to position desired fractions of a sensitized surface in registry with a portion of said opening.

4. A camera back comprising, in combination, a supporting member for application to a camera, a plate having an opening and slidably carried by said member, a square raised portion on said plate around said opening, flanges projecting at the four sides of said portion parallel with said member, a focusing screen and dark slide receiving frame having inwardly opening grooves on opposite edges for reversible engagement with chosen opposite flanges upon said portion, and means to locate said plate upon the supporting member with a desired portion of a dark slide centered with said opening.

TONY ZABROCKI.